United States Patent [19]
Cobbley et al.

[11] Patent Number: 5,546,538
[45] Date of Patent: Aug. 13, 1996

[54] SYSTEM FOR PROCESSING HANDWRITING WRITTEN BY USER OF PORTABLE COMPUTER BY SERVER OR PROCESSING BY THE COMPUTER WHEN THE COMPUTER NO LONGER COMMUNICATE WITH SERVER

[75] Inventors: David A. Cobbley; James A. Valerio; Frederick J. Pollack, All of Portland, Oreg.

[73] Assignee: Intel Corporation, Santa Clara, Calif.

[21] Appl. No.: 167,523

[22] Filed: Dec. 14, 1993

[51] Int. Cl.$^6$ .................................................. G06F 13/00
[52] U.S. Cl. ................ 395/200.01; 395/12; 395/182.11; 382/187; 364/222.2; 364/237.1; 364/237.6; 364/237.8; 364/237.81; 364/237.83; 364/DIG. 1
[58] Field of Search ................................. 395/200, 12, 2, 395/2.1, 2.4, 2.44, 2.55, 2.6, 200.01, 200.02, 200.09, 182.11; 358/400, 407, 311, 402; 382/10, 13

[56] References Cited

U.S. PATENT DOCUMENTS

| Re. 34,476 | 12/1993 | Norwood | 382/186 |
|---|---|---|---|
| 4,247,908 | 1/1981 | Lockhart, Jr. et al. | 395/200.01 |
| 4,725,694 | 2/1988 | Auer et al. | 345/173 |
| 4,901,223 | 2/1990 | Rhyne | 395/650 |
| 5,222,152 | 6/1993 | Fishbine et al. | 382/127 |
| 5,294,792 | 3/1994 | Lewis et al. | 250/221 |
| 5,313,051 | 5/1994 | Brigida et al. | 235/375 |
| 5,319,544 | 6/1994 | Schmerer et al. | 364/403 |
| 5,335,276 | 8/1994 | Thompson et al. | 380/21 |
| 5,347,477 | 9/1994 | Lee | 364/709.11 |
| 5,416,695 | 5/1995 | Stutman et al. | 379/38 |
| 5,426,284 | 6/1995 | Doyle | 235/385 |
| 5,434,777 | 7/1995 | Luciw | 395/12 |
| 5,459,798 | 10/1995 | Bailey et al. | 382/218 |
| 5,465,401 | 11/1995 | Thompson | 455/89 |

OTHER PUBLICATIONS

"Minicomputer–Based Laboratory for Speech Intelligibility Research", by Wen Lin, Nov. 1973, proceedings of the IEEE, pp. 1583–1588.

"On–Line Computers for Speech Research", by Peter Denes, Mar. 1970, IEEE Transactions on Audio and electroacoustics.

Primary Examiner—Thomas C. Lee
Assistant Examiner—Moustafa Mohamed Meky
Attorney, Agent, or Firm—Blakely, Sokoloff, Taylor & Zafman

[57] ABSTRACT

A computer arrangement that offloads computationally intensive tasks from portable computer devices to larger servers is disclosed. A portable computer device that relies on handwriting or speech for input is equipped with a wireless communication subsystem. When a user writes on the display or speaks into the portable computer device, the central processing unit passes the handwriting or speech information to the wireless communication subsystem. While the user is still inputting information, the wireless communication subsystem transmits received information to a communication server. The communication server routes the handwriting or speech information to a server that performs handwriting or speech recognition to translate the information into encoded text. The communication server then transmits the encoded text information back to the portable computer device.

18 Claims, 10 Drawing Sheets 5,546,538

SYSTEM FOR PROCESSING HANDWRITING WRITTEN BY USER OF PORTABLE COMPUTER BY SERVER OR PROCESSING BY THE COMPUTER WHEN THE COMPUTER NO LONGER COMMUNICATE WITH SERVER

BACKGROUND OF THE INVENTION

1. Field of the Invention

This invention relates to portable computer devices. More specifically to a computer system that offloads difficult tasks, such as handwriting and speech recognition from a portable computer device to larger computational servers using a wireless communication system.

2. Art Background

Portable computer devices are fast becoming part of modern life. Most portable computer devices rely upon keyboards for means of inputting information. To simplify the use of a portable computer devices, a new class of portable computer devices has emerged that rely upon input devices other than keyboards. For example, several new portable computer devices such as the Newton® Message-Pad by Apple® Computer and the Wizard® by Sharp allow a user to enter information by writing onto a flat panel display using a stylus or finger. The portable computer device processes the user's handwriting using a handwriting recognition algorithm that translate the user's handwriting into encoded text. Other systems allow a user to enter information by speaking into the device.

Handwriting recognition and speech recognition have proven to be a very difficult task. To accurately recognize the text that a user has written by hand, a handwriting recognition algorithm must perform thousands of calculations per word. Speech recognition programs must find the gaps between words and attempt to recognize each word. It is therefore ideal to have a very fast microprocessor in a portable computer that performs handwriting or speech recognition. However, fast microprocessors usually have a set of characteristics that make them unsuitable for use in a portable computer system. Fast microprocessors often use large amounts of power such that if a fast microprocessor is placed into portable computer, the amount of time the portable computer can operate on a battery will be greatly reduced. Due to the high power consumption, fast microprocessors generally generate significant amounts of heat that needs to be dissipated. Finally, fast microprocessor are expensive and would thus greatly increase the cost of any portable computer system containing a fast microprocessor.

Furthermore, the accuracy of handwriting and speech recognition programs can be greatly improved if there is a large amount of external storage available. With a large external storage device, such as a hard disk drive, the portable computer device can store a large dictionary that contains information about words that a user may write or speak. For example, a handwriting recognition program may contain a database of information that would help recognize a particular user's handwriting strokes in different contexts. A speech recognition program may access a database storing information about a particular speaker's pronunciation style. These databases can be used to verify the words written or spoken by a user. However, large external storage devices, such as hard disk drives, add extra weight and also tend to require significant amounts of power. Thus, it is desirable to omit such peripherals from portable computer devices.

SUMMARY OF THE INVENTION

It is therefore an object of the present invention to provide an efficient system for performing computational intensive tasks, such as handwriting and speech recognition, on portable computer devices.

It is a further object of the present invention to perform such computational intensive tasks on portable computer devices without requiring significant amounts of power.

These and other objectives are accomplished by the computer arrangement of the present invention that offloads computationally intensive tasks from portable computer devices to larger servers. In the present invention, a portable computer device that relies on handwriting or speech for input is equipped with a wireless communication subsystem. When a user writes on the display or speaks into the portable computer device, the central processing unit passes the handwriting or speech information to the wireless communication subsystem. While the user is still inputting information, the wireless communication subsystem transmits received information to a communication server. The communication server routes the handwriting or speech information to a server that performs handwriting or speech recognition to translate the information into encoded text. The communication server then transmits the encoded text information back to the portable computer device.

BRIEF DESCRIPTION OF THE DRAWINGS

The objects, features and advantages of the present invention will be apparent to one skilled in the art, in view of the following detailed description in which.

DETAILED DESCRIPTION OF THE INVENTION

A method of improving the performance of portable computers by offloading computationally intensive tasks is disclosed. In the following description, for purposes of explanation, specific nomenclature is set forth to provide a thorough understanding of the present invention. However, it will be apparent to one skilled in the art that these specific details are not required in order to practice the present invention. Furthermore, well known circuits and devices are shown in block diagram form in order not to obscure the present invention unnecessarily.

Portable Computer Device

Figure 1:
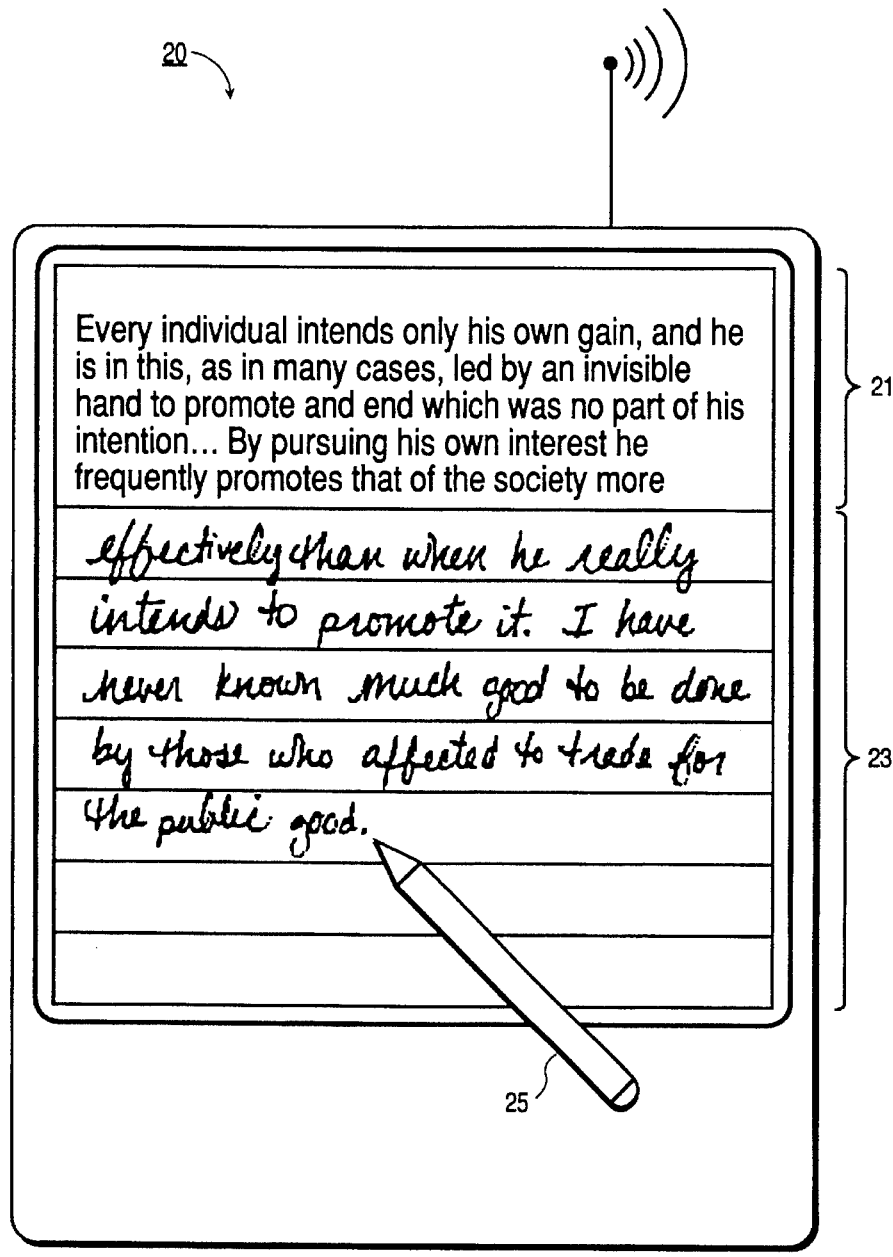
FIG. 1 is a diagram of a portable computer device that uses a stylus for input and performs handwriting recognition.

FIG. 1 illustrates a portable computer device 20 that utilizes a user's handwriting for input. A user of the portable computer device 20 writes on the display area using a stylus 25 or a finger. The portable computer device 20 interprets what the user writes in the display area and reacts accordingly.

In FIG. 1, the portable computer device 20 is illustrated in a "writing" mode where the user writes using a stylus 25 into a set of lines 23 on the display. The portable computer device 20 analyzes each line written in by the user using a handwriting recognition algorithm. After analyzing a line of handwriting, the portable computer device 20 replaces the line of hand written text with typed text 21 as illustrated.

The typed text 21 has several advantages over the handwritten text. Using typed text, more information can be presented on the display screen since the typed text 21 is physically smaller than the handwritten text as illustrated in FIG. 1. Furthermore, the portable computer device 20 stores the typed text 21 in a compact encoded form such that less memory is required to store the typed text 21 than the written text 23. Once the text is in encoded form, the portable computer device 20 can transmit the encoded text in an email message requiring less bandwidth for the transmission.

Existing portable computer devices that rely on handwriting recognition for input often have great difficulties when attempting to recognize what a user has written. One reason that existing portable computer devices poorly perform handwriting recognition is that handwriting recognition is a very difficult task that requires significant computer resources such as high speed processor and a large amount of external storage space.

To perform accurate handwriting recognition, the microprocessor in a portable computer device must perform thousands of calculations on each word. While performing these calculations, may existing portable computer devices force the user to wait while the portable computer device interprets the writing. This waiting period tends to be disruptive since the user must cease writing so the portable computer device can analyze the writing. If a user is attempting to take notes during a meeting in real-time, the waiting periods essentially make the portable computer device useless.

Thus, it would be desirable to use a very fast microprocessor in a portable computer device that performs handwriting recognition to reduce the waiting period. However, fast microprocessors usually require significant amounts of power to operate. Microprocessors that require large amounts of power are ill suited for portable computer devices since portable computer devices must rely on battery power and high power circuits drain the battery quickly. Furthermore, fast microprocessors often dissipate large amounts of heat. The heat generated by fast microprocessors is a particular problem in portable computer devices since such devices usually do not have a fan for cooling since the fan add additional weight and volume, consume more power and generate undesirable noise. Finally, fast microprocessors are expensive. To keep the unit cost of a portable computer device low, manufacturers would like to avoid the use of expensive components.

Another important factor in performing accurate handwriting recognition is the amount of external memory available. One technique used by handwriting recognition algorithms is to identify certain text characteristics such as loops, dots, descenders in words. The handwriting recognition algorithm then searches a database for words that have the same characteristics identified in the writing. Clearly, the larger the database is, the more likely the handwriting recognition algorithm will be able to identify a written word. Furthermore, a database can be used to store information about a particular writer's style. For example, a particular set of strokes that a writer typically creates when writing particular characters and words can be stored. When handwriting algorithms fail to match a character, the writer's stoke database can then be searched for a match.

However, it is difficult to provide a large external storage device on portable computer device. Similar to fast microprocessors, large external storage devices, such as hard disk drives, consume large amounts of power and generate heat. Large external memory devices also add extra weight to a device. Since it is impracticable to build an inexpensive lightweight battery powered portable computer device that contains a very fast microprocessor and large external memory, another method of improving handwriting recognition in portable computer devices is necessary.

Computational Support for Portable Computer Devices

To improve the performance of portable computer devices that rely on handwriting recognition, the present invention teaches an arrangement where a portable computer device offloads difficult tasks such as handwriting recognition to a server. The portable computer device offloads the difficult task by transmitting the task data across some wireless communication means to the server. The server has access to powerful processors and analyzes the task data for the portable computer device. After completing its analysis, the server transmits the analyzed task data back to the portable computer device.

Figure 2:
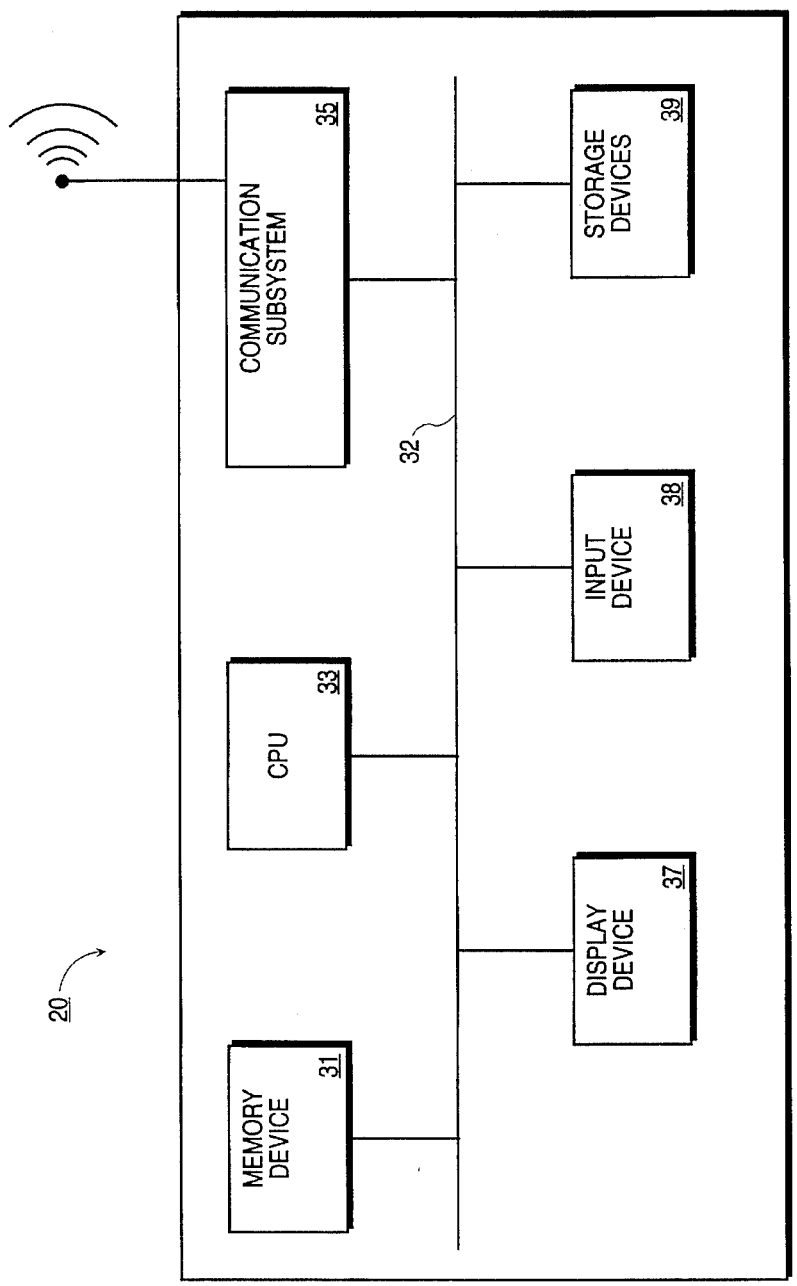
FIG. 2 is a block diagram of a portable computer device as constructed according to the teachings of the present invention.

FIG. 2 illustrates a block diagram of a portable computer device 20 constructed according to the teachings of the present invention. The portable computer device 20 comprises in part several elements common to most digital computer devices such as a central processing unit (CPU) 33, a memory 31, a display device 37, a storage device 39, and an input device 38. The various computer elements are coupled together by a bus 32.

Also coupled to the bus 32 is a wireless communication subsystem 35. The wireless communication subsystem 35 may comprise one of many different types of wireless communication systems. Possible wireless communication systems include infrared transmitters & receivers, cellular telephone, packet radio, and low-power cellular. However, it should be understood that any type of wireless communication system that can transmit and receive digital information can be used to implement the present invention.

Figure 3:
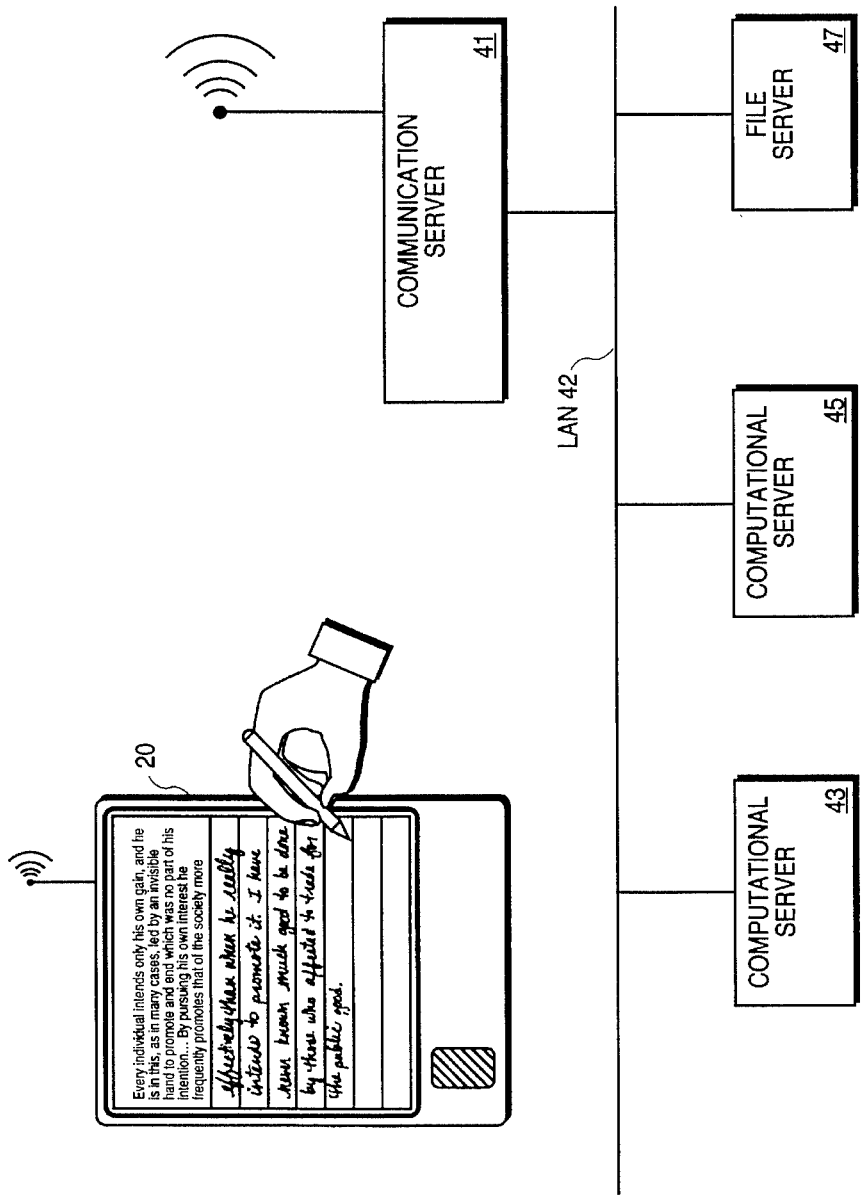
FIG. 3 is a block diagram of a computer a network that contains a communication server and computational servers for supporting a portable computer device that performs handwriting recognition.

Referring to FIG. 3, the wireless communication subsystem in the portable computer system 20 communicates with a communication server 41. The communication server 41 is coupled to a Local Area Network (LAN) 42 such that the communication server 41 can communicate with any other entity coupled to the LAN 42. For example, the communication server 41 can deliver information received from the portable computer device 20 to computational server 43 or computational server 45. Likewise, any entity coupled to the LAN 42 can transmit information to the portable computer device 20 via the communication server 41.

To support portable computer devices, certain servers coupled the LAN 42 can be dedicated to the task of performing calculations for portable computer devices. Furthermore, the file server 47 may store databases of information to aid the computational servers 43 and In a first embodiment of the present invention, the display device 37 comprises flat panel display and the input device 38 comprises a touch-sensitive overlay for the flat panel display and a stylus for writing onto the touch-sensitive overlay as illustrated in FIG. 1. To accept handwriting from a user, the CPU 33 monitors the touch-sensitive overlay. When a user writes onto the touch-sensitive overlay, the CPU 33 activates the pixels on the flat panel display such that the user's writing appears on the display.

Figure 4A:
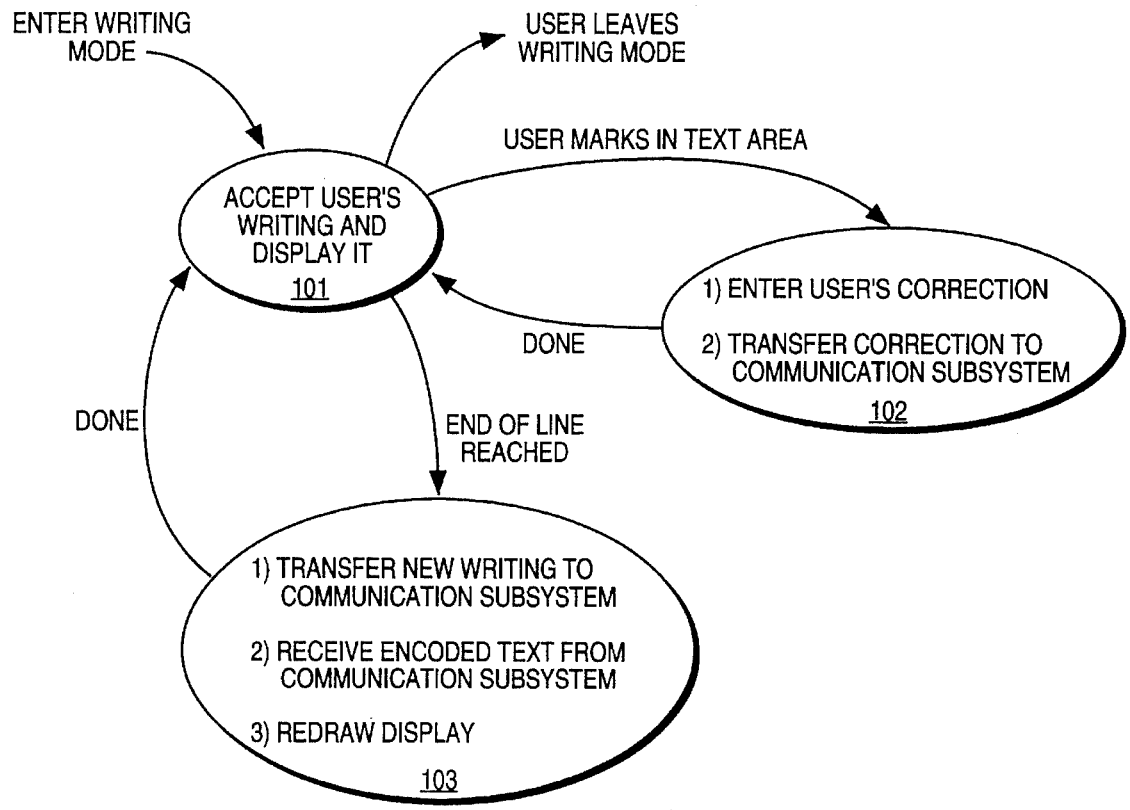
FIG. 4a is a state diagram of a writing routine for a portable computer device that offloads the task of handwriting recognition.

To interpret a user's handwriting, the CPU 33 in the portable computer device 20 enters a writing routine. FIG. 4a illustrates a state diagram for the CPU 33 for the writing routine. In a main writing state 101 of the writing routine, the CPU 33 monitors the touch-sensitive overlay and accepts the user's writing. When the user reaches the end of a line, the CPU 33 briefly enters a service state 103. In the service state 103, the CPU 33 passes the new line of handwriting entered by the user to the communication subsystem 35 and receives any information from communication subsystem 35. The CPU 33 uses the information received from the communication subsystem 35 to redraw the display and then returns to the main writing state 101.

When the portable computer device 20 is in the main writing state 101, the user may also enter corrections to the text in the text area 21 of FIG. 1. If the user enters a correction, the portable computer device 20 enters a correction state 102. In the correction state 102, the portable computer device 20 makes the correction specified by the user. The portable computer device 20 also transfers information about the correction to the communication subsystem 35. The correction information will be transmitted to the handwriting recognition routine such that it will learn from the mistake.

Figure 5A:
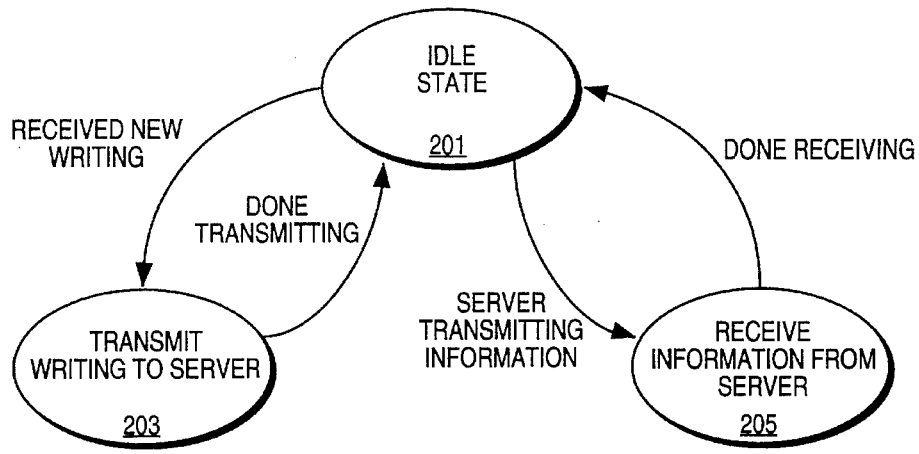
FIG. 5a is a state diagram for a half duplex communication subsystem in a portable computer device that offloads the task of handwriting recognition.

The communication subsystem 35 of the present invention operates concurrently with the CPU 33. FIG. 5a illustrates a state diagram that describes how the communication subsystem 35 operates while the CPU 33 is in the writing routine. Referring to FIG. 5a, the communication subsystem 35 starts in an idle state 201. As previously stated, when a user completes a line of handwriting, the CPU 33 passes the handwriting information to the communication subsystem 35. When the communication subsystem 35 receives the handwriting information, the communication subsystem 35 enters transmitting state 203 where it transmits a portable computer device identity code and the handwriting information to a communication server 41. The portable computer device identity code uniquely identifies the portable computer device such that the communication server 41 knows which portable computer device transmitted the information. When the communication subsystem 35 completes the transmission of the handwriting information, the communication subsystem 35 returns to the idle state 201.

If the communication subsystem 35 detects a transmission from the communications server 41 while in the idle state 201, the communication subsystem 35 enters a receiving state 205. In the receiving state 205, the communication subsystem 35 receives the information transmitted from the communications server 41. After receiving the information transmitted from the communications server 41, the communication subsystem 35 returns to the idle state 201.

Figure 5B:
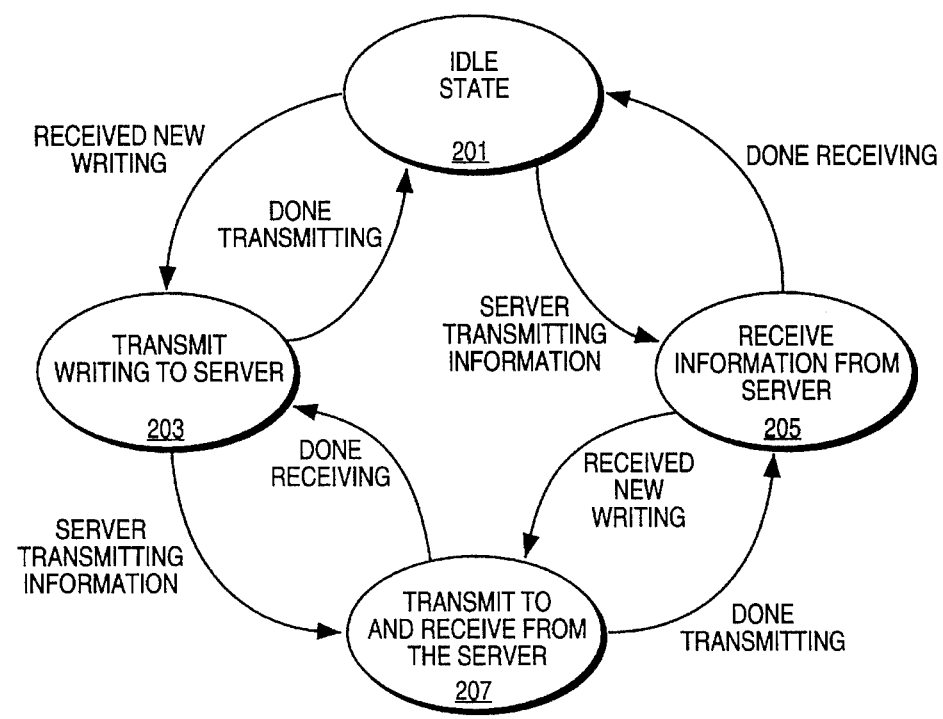
FIG. 5b is a state diagram for a full duplex communication subsystem in a portable computer device that offloads the task of handwriting recognition.

Ideally, the communication subsystem 35 will be full duplex such that the communication subsystem 35 can both transmit and receive information simultaneously. FIG. 5b illustrates a state diagram for a communication subsystem 35 that can simultaneously transmit and receive information. FIG. 5b is similar to FIG. 5a except that it contains an additional state, state 207, where the communication subsystem 35 simultaneously transmits information to the communications server 41 and receives information from the communications server 41.

Referring to FIG. 3, when the communications server 41 receives a message with a portable computer device identity code and handwriting information from a portable computer device, the communications server 41 passes the message to a dedicated handwriting recognition process. The dedicated process applies a handwriting recognition algorithm to the handwriting data received from the portable computer device to translate the handwriting information into encoded text.

Figure 6:
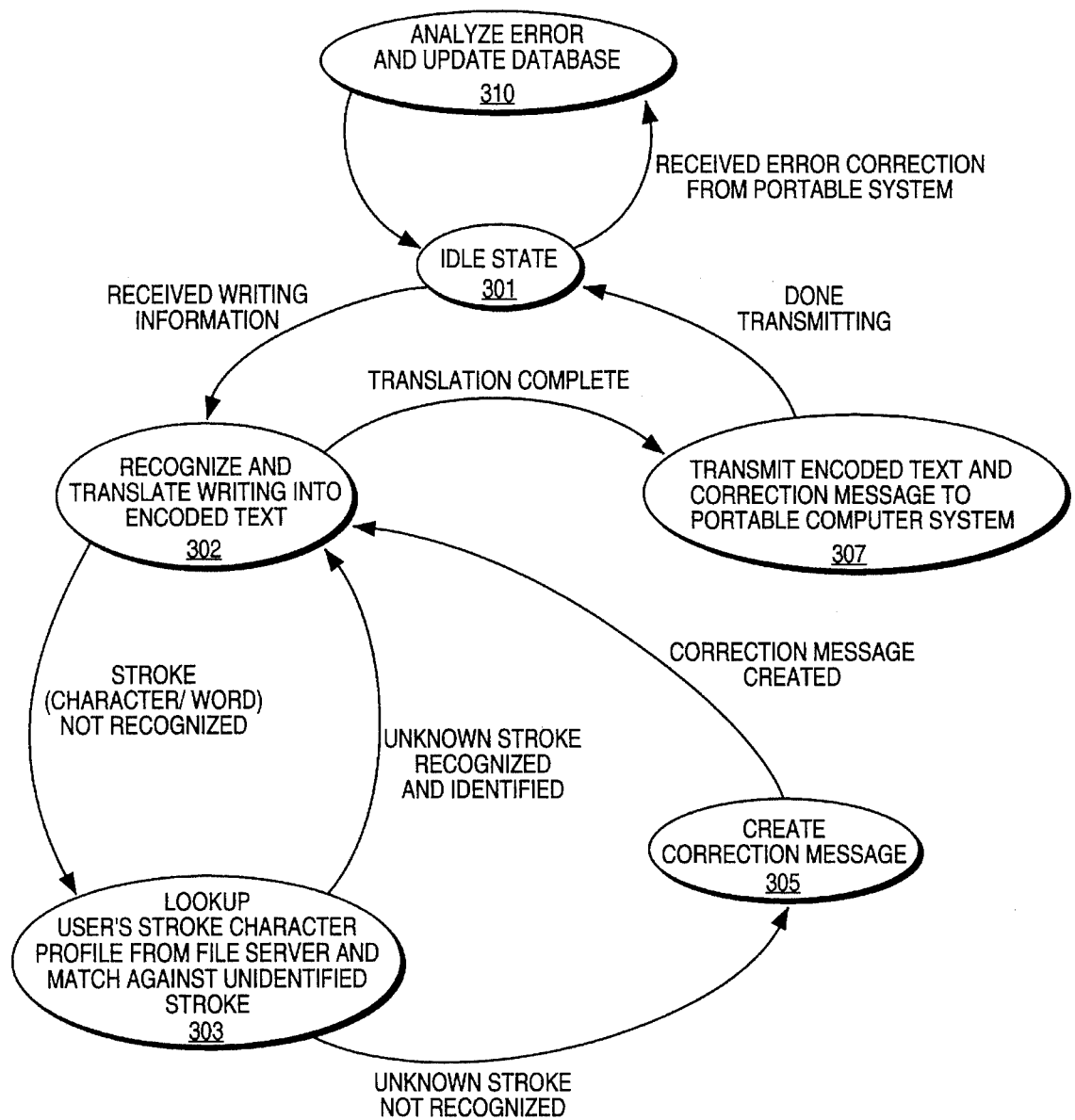
FIG. 6 is a state diagram that describes that operating states of process on a server that performs handwriting recognition.

FIG. 6 illustrates the operating states of the handwriting recognition process. State 301 of the state diagram represents an idle state where the handwriting recognition process waits for input messages. When a message containing handwriting information is received, the handwriting recognition process proceeds to state 302.

At state 302, the handwriting recognition process attempts to recognize the written information and translate it into encoded text. If the handwriting recognition process is able to recognize the words, the handwriting recognition process proceeds to state 307 where the encoded text is packaged into a return message and sent back to the portable computer device. If the handwriting recognition process cannot recognize one of the user's strokes, then the handwriting recognition process proceeds to personalized analysis state 303.

At state 303, the handwriting recognition process examines the identity code associated with the portable computer device or an identity code associated with the particular user. The handwriting recognition process then accesses a personalized character stroke profile associated with that particular portable computer device or user. The personalized character stroke profile contains information describing the user's specific writing habits. The handwriting recognition process uses the information in the personalized character stroke profile to recognize the written information. If the handwriting recognition process is successful in recognizing the written information using the information in the personalized character stroke profile, then the handwriting recognition process moves back to state 302 where it proceeds to perform handwriting recognition. If the handwriting recognition process still fails to recognize the written information using the information in the personalized character stroke profile, then the handwriting recognition process moves to state 305 where it creates a correction message that will be transmitted back to portable device 20.

After performing the translation at state 302, the handwriting recognition process proceeds to state 307. At state 307, the handwriting recognition process packages a message containing the encoded text, any correction messages generated, and an identity code that identifies portable computer device that transmitted the handwriting information. The handwriting recognition process passes the packaged message to the communications server 41 that transmits the message to the appropriate portable computer device. The handwriting recognition process then returns to the idle state 301.

When a user corrects a mistake made by the handwriting recognition process, the portable device 20 will transmit a correction message to the handwriting recognition process. When the handwriting recognition process is in the idle state 301 and receives a correction message, the handwriting recognition process moves to state 310. In state 310, the handwriting recognition process analyzes the correction information to learn from the mistake. The handwriting recognition process then writes new information into the user's personalized character stroke profile such that the personalized character stroke profile adapts to the user's specific habits.

The dedicated handwriting recognition process may reside on a computational server, such as computational server 43 or 47. By residing on a computational server, the dedicated handwriting recognition process can have access to a very fast processor.

It will be appreciated by the reader that a single computational server can be used to support several different portable computer devices used by several different users. Thus, the cost of a sophisticated high-speed server can be spread across several users.

Figure 4B:
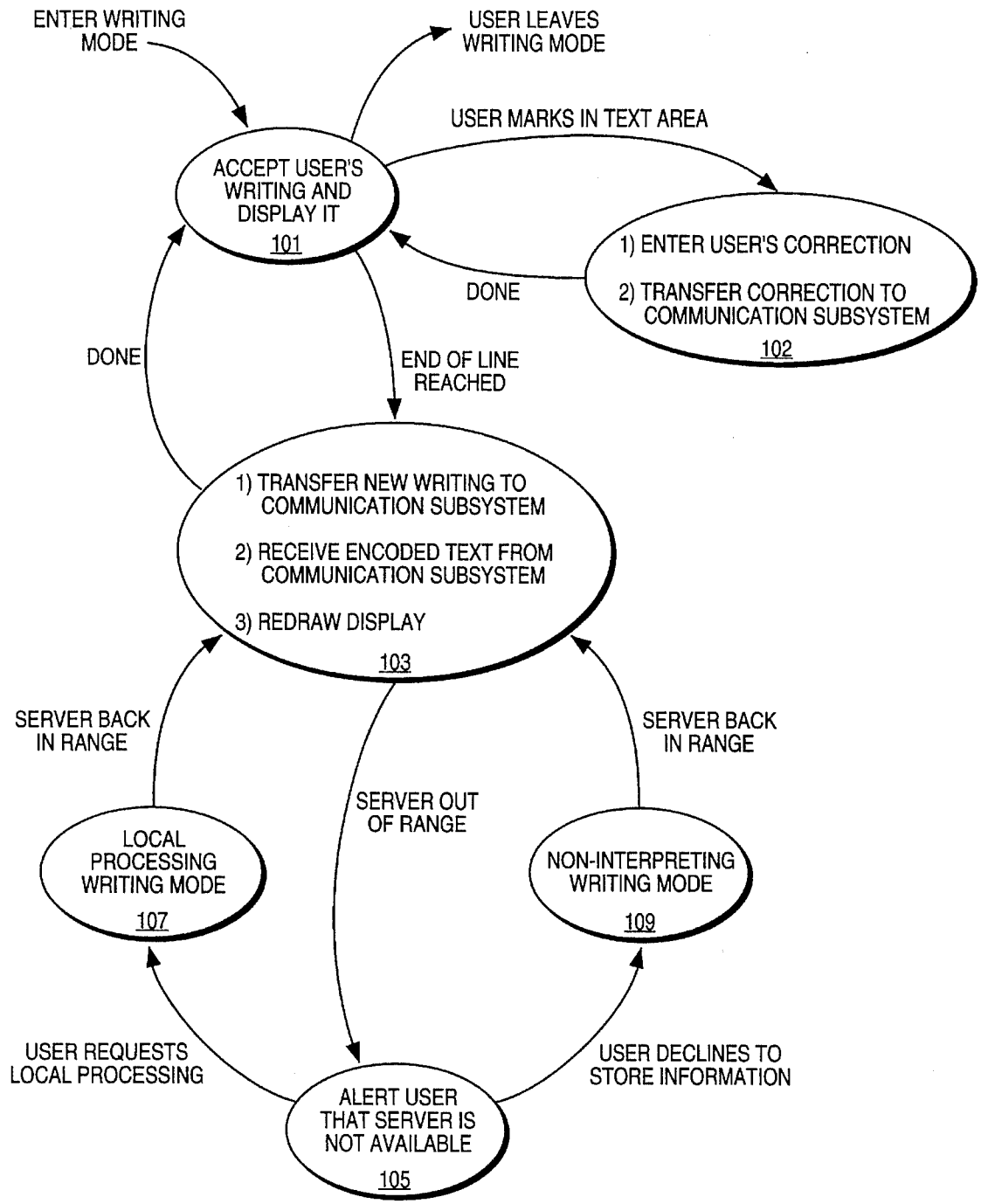
FIG. 4b is an expanded state diagram of a writing routine for a portable computer device that offloads the task of handwriting recognition where the portable computer device informs the user when the communication server is out of range.

A user of a portable computer device may move far enough away from the communication server 41 such that the portable computer device 20 and the communication server 41 can no longer communicate. When this occurs, the portable computer device 20 can no longer depend upon support from the computational server. FIG. 4*b* illustrates an expanded state diagram for a writing routine that detects when the communication server 41 is out of range. If the CPU detects at state 103 that the communication server 41 is out of range, the portable computer device 20 informs the user and requests the user whether the portable computer device 20 should attempt handwriting recognition locally or simply store the handwriting information as a graphical bitmap ("magnetic ink"). If a user stores the information as a graphical bitmap, the user may later request a computational server perform handwriting recognition on the stored information when the user moves back into range.

If the user decides to have the portable computer device 20 perform the handwriting recognition locally, the CPU 33 enters state 107 where the user writes on the display and the portable computer device 20 attempts to decipher the users handwriting using the CPU 33 in the portable computer device 20. Performing the handwriting recognition locally will likely be slow, but there are some situations when this may be necessary. When the portable computer device 20 detects that the communications server 41 is back in range, the CPU 33 can return to the normal writing states 101 and 103.

If the user decides to have the portable computer device 20 store the handwriting information, the portable computer device 20 enters state 109. In state 109, the portable computer device 20 stores the user's handwriting as graphical bitmap information. The graphical bitmap information requires more memory to store than encoded text, but very little processing is required to store the graphical bitmap information. When the portable computer device 20 detects that the communications server 41 is back in range, the portable computer device 20 can transmit all the graphical bitmap information stored to the communications server 41 for processing and return to the normal writing mode.

Speech Recognition Portable Computer Device

After handwriting recognition, the next step for a highly intuitive user interface is speech recognition. Speech recognition is even more computationally intensive than handwriting recognition. Furthermore, digitizing speech information requires large amounts memory. Thus, performing speech recognition with a portable computer device is very difficult. However, a portable computer device constructed according to the teachings of the present invention can perform accurate speech recognition with current technology.

Referring back to FIG. 2, in a second embodiment of the present invention, the input device 38 would comprise a microphone coupled to Analog-to-Digital (A/D) converter circuitry. A user would operate the portable computer device by speaking into the microphone. A physical switch operated by the user or a voice activation switch would enable the A/D converter circuitry such that the A/D converter circuitry would convert the user's speech into a digitized stream of speech information. The CPU 33 in the portable computer device 20 would pass the digitized speech information to the communication subsystem 35.

Figure 8:
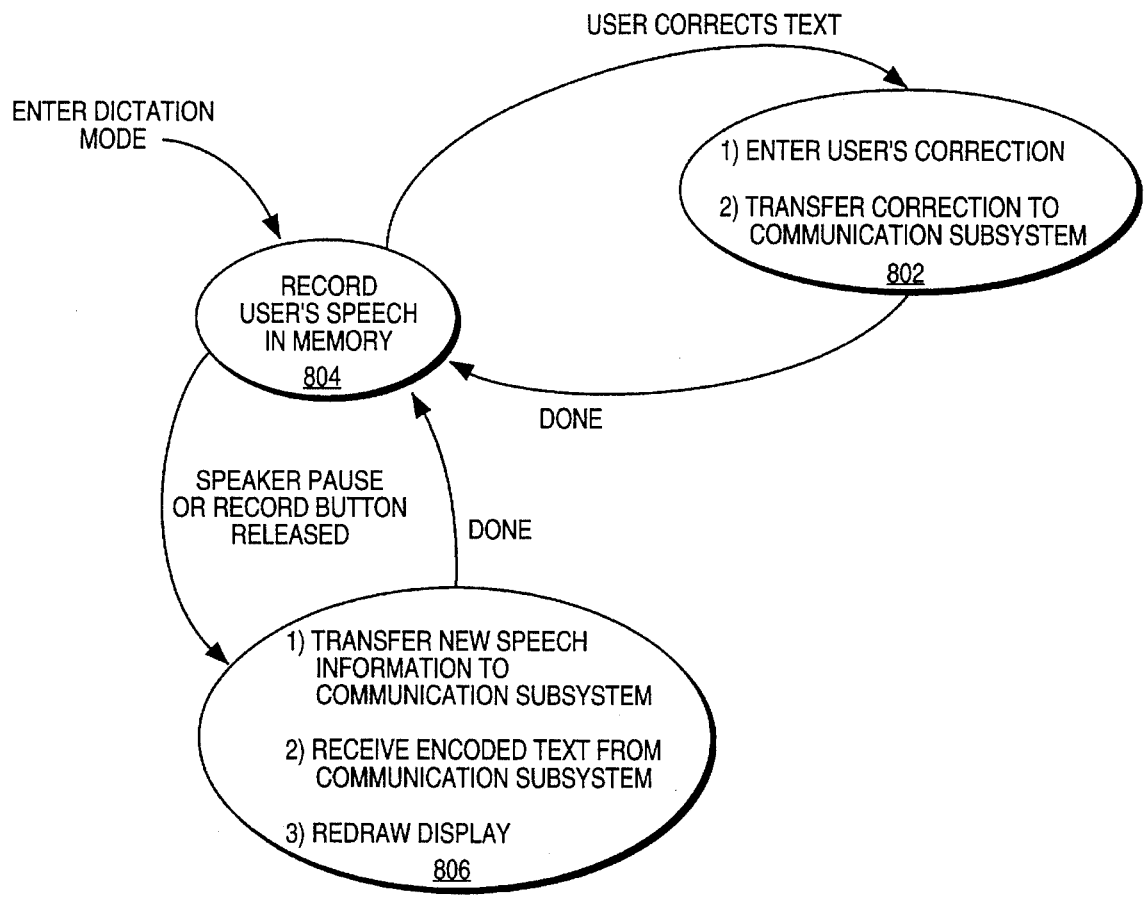
FIG. 8 is a state diagram of a dictation mode for a portable computer device that offloads the task of speech recognition.

To interpret a user's speech, the CPU 33 in the portable computer device 20 enters a dictation routine. The dictation routine is entered by pressing a button on the portable computer device 20. Alternatively, the dictation routine may entered when a voice activated device detects a user speaking into the portable computer device 20. FIG. 8 illustrates a state diagram while in the dictation routine. In a main dictation state 804, the CPU 33 of the portable computer device 20 monitors Analog to Digital device connected to a microphone to obtain digitized speech information.

When the user release the button or pauses while speaking, the CPU 33 briefly enters a service state 806. In the service state 806, the CPU 33 passes the new digitized speech information to the communication subsystem 35 and receives any information from communication subsystem 35. The CPU 33 uses the information received from the communication subsystem 35 to redraw the display and then returns to the main dictation state 804.

When the portable computer device 20 is in the main dictation state 804, the user may also enter corrections to the text in the text area 21 of FIG. 1. If the user enters a correction, the portable computer device 20 enters a correction state 802. In the correction state 802, the portable computer device 20 makes the correction specified by the user. The portable computer device 20 also transfers information about the correction to the communication subsystem 35. The correction information will be transmitted to the speech recognition routine such that the speech recognition routine can retrain itself on the mistaken word.

Figure 7:
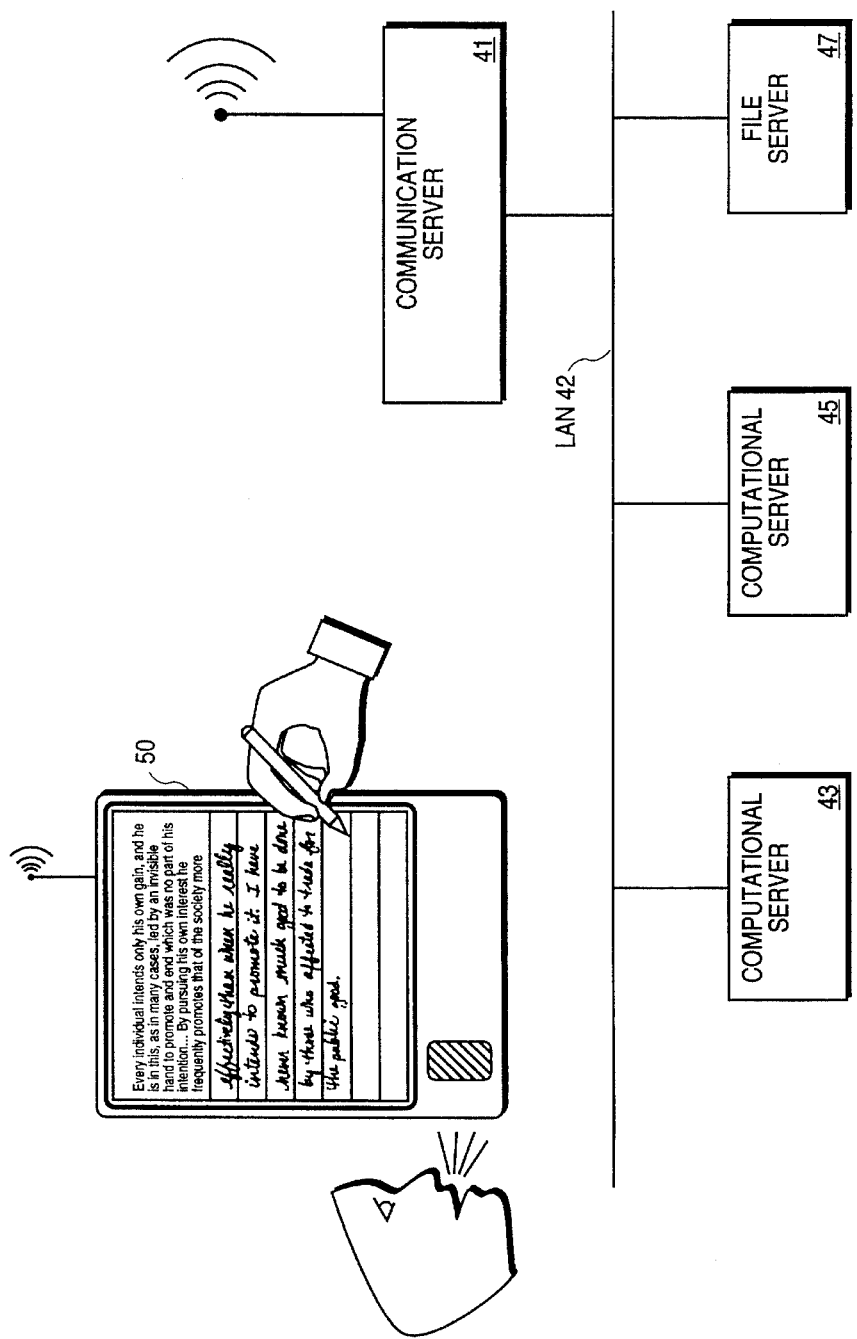
FIG. 7 is a block diagram of a computer a network that contains communication servers and computational servers for supporting a portable computer device that performs speech to text conversion.

Referring to FIG. 7, the communication subsystem in the portable computer device 20 transmits the digitized speech information to a communications server 41. To transmit the speech information to a server, the communication uses the same state diagram illustrated in FIGS. 5a and 5b. The communication server 41 passes the digitized speech information to a computational server (such as server 43 or 47) that has a process dedicated to translating digitized speech information into written text. After translating the digitized speech information into written text, the computational server passes the encoded text to the communication server 41. The communication server 41 transmits the encoded text back to the portable computer device 20.

Figure 9:
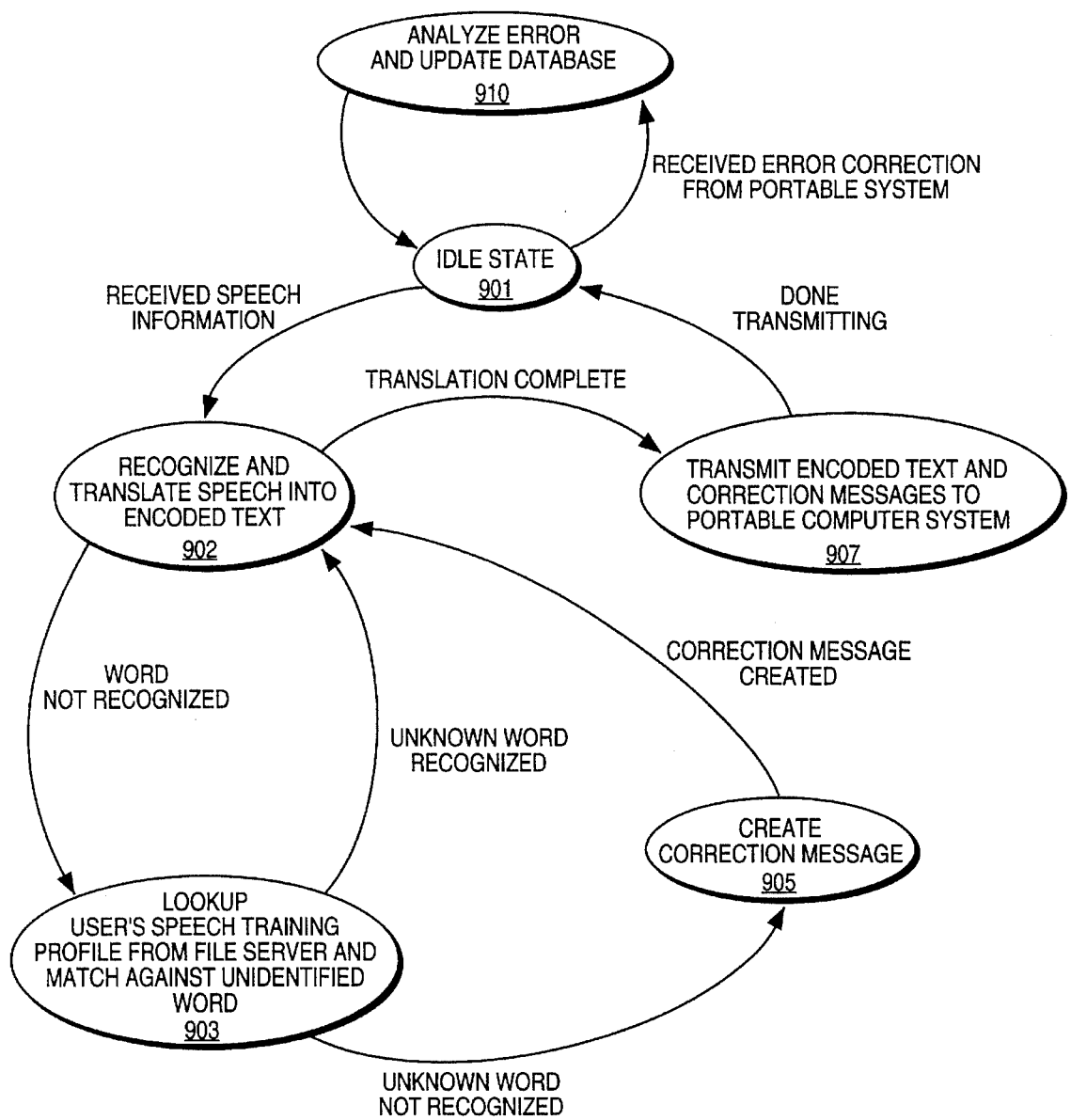
FIG. 9 is a state diagram that describes that operating states of process on a server that performs speech recognition.

FIG. 9 illustrates the operating states of the speech recognition process. State 901 of the state diagram represents an idle state where the speech recognition process waits for messages. When the speech recognition process receives a message containing speech information to be interpreted, the speech recognition process proceeds to state 902.

At state 902, the speech recognition process attempts to interpret the speech information and translate the speech into encoded text. If the speech recognition process is able to recognize the words spoken by the user, the speech recognition process proceeds to state 907 where the encoded text is packaged into a return message and sent back to the portable computer device. If the speech recognition process cannot recognize one of the words spoken by the user, then the speech recognition process proceeds to personalized analysis state 903.

At state 903, the speech recognition process examines the identity code associated with the portable computer device or an identity code associated with the particular user. The speech recognition process then accesses a personalized speech pattern profile associated with that particular portable computer device or user. The personalized speech pattern profile contains information describing the user's specific speaking habits. The speech recognition process uses the information in the personalized speech pattern profile to recognize the unknown word. If the speech recognition process is successful in recognizing the word using the information in the personalized speech pattern profile, then the speech recognition process moves back to state 902 where it proceeds to perform speech recognition. If the speech recognition process still fails to recognize the unknown word using the information in the personalized speech pattern profile, then the speech recognition process moves to state 905 where it creates a correction message that will be transmitted back to portable device 20.

After performing the speech translation at state 902, the speech recognition process proceeds to state 907. At state 907, the speech recognition process packages a message containing the encoded text, any correction messages generated, and an identity code that identifies portable computer device that transmitted the speech information. The speech recognition process passes the packaged message to the communications server 41 that transmits the message to the appropriate portable computer device. The speech recognition process then returns to the idle state 901.

When a user corrects a mistake made by the speech recognition process, the portable device 20 will transmit a correction message to the speech recognition process on a server. When the speech recognition process is in the idle state 901 and receives a correction message, the speech recognition process moves to state 910. In state 910, the speech recognition process retrains itself on the word that it identified incorrectly.

All portable computer devices constructed using the teachings of the present invention contain a portable computer device identity code that uniquely identifies the portable computer device. By routing messages from different portable computer devices to different processes on a computational servers using a the portable computer device identity code, a single computational server can support several types of portable computer devices at once. For example, messages from handwriting operated portable computer devices can be routed to handwriting recognition processes and messages from speech operated portable computer devices can be routed to speech recognition processes.

The foregoing has described a portable computer system. It is contemplated that changes and modifications may be made by one of ordinary skill in the art, to the materials and arrangements of elements of the present invention without departing from the scope of the invention.

We claim:

1. A computer arrangement, said computer arrangement comprising the elements of:

a portable computer device, said portable computer device comprising:
an input device comprising a stylus and a flat panel display, said input device accepting input data on said flat panel display from a user, said input data comprises handwriting written by said user; and
a wireless communication subsystem, said wireless communication subsystem transmitting said input data, said wireless communication subsystem operating concurrently with said input device; and
a server, said server receiving said transmitted input data, said server processing said input data to generate encoded text interpreted from said handwriting written by said user, said server transmitting processed data to said portable computer device for subsequent use by said portable computer device;
wherein, when said input data is not transmitted over said wireless communication subsystem to said server since the portable computer device can no longer communicate with the server, then said input data is processed on said portable computer device to generate said processed data.

2. The computer arrangement as claimed in claim 1, wherein said input device further comprises a microphone and an analog to digital converter that converts human speech into digitized speech information.

3. The computer arrangement as claimed in claim 2 wherein said processed data further comprises encoded text interpreted from said digitized speech information.

4. The computer arrangement as claimed in claim 1 wherein said portable computer device further comprises an identity code uniquely identifying said portable computer device and said portable computer device transmits said identity code along with said input data.

5. The computer arrangement as claimed in claim 4 wherein said server accesses a particular user profile using said identity code and processes said input data using said particular user profile.

6. The computer arrangement as claimed in claim 1 wherein said use of said processed data by said portable computer device is performed concurrently with the acceptance of subsequent input data by said input device.

7. The computer arrangement as claimed in claim 1 wherein:

said portable computer device further comprises a display device; and
said use of said processed data by said portable computer device comprises the display of said processed data on said display device.

8. The computer arrangement as claimed in claim 1 wherein:

said portable computer device further comprises a storage device; and said use of said processed data by said portable computer device comprises the storage of said processed data in said storage device.

9. The computer arrangement as claimed in claim 1 wherein:

said input device further receives correction input of said processed data input by the user;

said portable computer device, in response to the receipt of the correction input, generates error correction data;

said wireless communication subsystem transmitting the error correction data to the server;

said server receiving the error correction data and using the error correction data to improve the processing of subsequent input data.

10. A method of processing input data, said method comprising the steps of:

monitoring an input device on a portable computer device, said input device comprises a stylus and a flat panel display;

generating input data when a user uses said input device, said input data comprises handwriting written by said user, when said flat panel display detects said stylus contacting said flat panel display;

transmitting said input data over a wireless communication system to a server computer concurrently with said monitoring of said input device;

processing said input data transmitted to said server to generate encoded text interpreted from said handwriting written by said user;

transmitting said processed data over said wireless communication system back to said portable computer device; and using said processed data by said portable computer device; wherein, when the step of transmitting input data over said wireless communication subsystem to said server computer concurrently with said monitoring of said input device is not performed since the portable computer device can no longer communicate with the server computer, then said input data is processed on said portable computer device to generate said processed data.

11. The method of processing input data as claimed in claim 10 wherein said input device further comprises a microphone and an analog to digital converter that converts human speech into digitized information.

12. The method of processing input data as claimed in claim 11 wherein said processed data further comprises encoded text interpreted digitized speech information.

13. The method of processing input data as claimed in claim 10 wherein said portable computer device further comprises an identity code uniquely identifying said portable computer device and said step of transmitting said input data further comprises transmitting said identity code along with said input data.

14. The method of processing input data as claimed in claim 13 wherein said step of processing said input data further comprises accessing a particular user profile using said identity code; and processing said input data using said particular user profile.

15. The method of processing input data as claimed in claim 10 further comprising the step of displaying said processed data on said portable computer device after the step of transmitting said processed data over said wireless communication system back to said portable computer.

16. The method of processing input data as claimed in claim 15 further comprising steps of:

monitoring said input device for corrections of said processed data; p1 generating error correction data when said user corrects said processed data;

transmitting said error correction data to said server; and said server using said error correction data to improve the processing of subsequent input data after the step of displaying the said processed data on said portable computer device.

17. The method of processing input data as claimed in claim 10 further comprising the step of storing said processed data in said portable computer device after the step of transmitting said processed data over said wireless communication system back to said portable computer.

18. The method of processing input data as claimed in claim 10 wherein:

the step of transmitting said input data over a wireless communication system to a server computer concurrently with said monitoring of said input device is performed selectively; and when the step of transmitting said input data over a wireless communication system to a server computer concurrently with said monitoring of said input device is not performed, said input data is stored on said portable computer device for later transmission to said server computer for the generation of processed data.

* * * * *

UNITED STATES PATENT AND TRADEMARK OFFICE
CERTIFICATE OF CORRECTION

PATENT NO. : 5,546,538
DATED : August 13, 1996
INVENTOR(S) : David A. Cobbley, et al.

It is certified that error appears in the above-indentified patent and that said Letters Patent is hereby corrected as shown below:

In column 5 at line 21 insert --45.-- following "43 and"

In column 12 at line 24 delete "p1" following "data;"

Signed and Sealed this

Fifth Day of November, 1996

Attest:

BRUCE LEHMAN

Attesting Officer    Commissioner of Patents and Trademarks